D. C. BRAWLEY.
SAND-PUMP REELS.
No. 193,475.   Patented July 24, 1877.
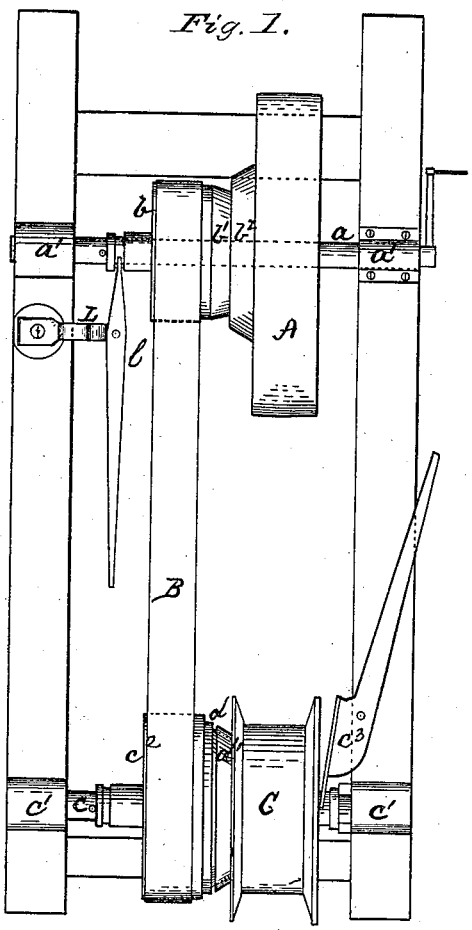
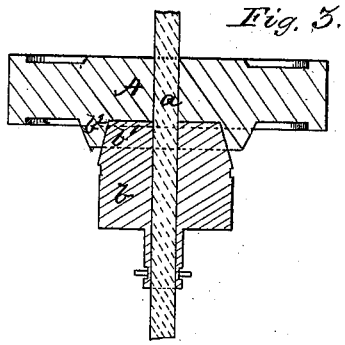
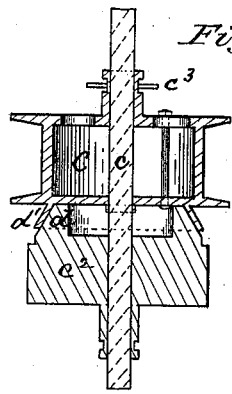
Witnesses
John K. Smith
R. C. Wrenshall
Inventor
Dewitt C. Brawley
by Bakewell & Kerr
atty's

UNITED STATES PATENT OFFICE.

DEWITT C. BRAWLEY, OF PETROLIA, PENNSYLVANIA.

IMPROVEMENT IN SAND-PUMP REELS.

Specification forming part of Letters Patent No. 193,475, dated July 24, 1877; application filed July 2, 1877.

*To all whom it may concern:*

Be it known that I, D. C. BRAWLEY, of Petrolia, in the county of Butler and State of Pennsylvania, have invented a new and useful Improvement in Sand-Pump Reels; and I do hereby declare the following to be a full, clear, and exact description thereof, reference being had to the accompanying drawings, forming part of this specification, in which—

Figure 1 is a plan view of devices embodying my invention. Fig. 2 is a sectional view of the reel-drum and clutch mechanism. Fig. 3 is a sectional view of the band-wheel and its clutch mechanism.

Like letters refer to like parts wherever they occur.

My invention relates to the construction of sand-reel pumps and the devices for operating the same; and consists in mounting the reel or drum upon an independent shaft and driving it from the band-wheel or band-wheel shaft by suitable gearing or belting and interposed clutch mechanism.

I will now proceed to describe my invention, so that others skilled in the art to which it appertains may apply the same.

A indicates the band-wheel, secured to a suitable shaft, $a$, which is journaled in bearings $a'$ $a'$. Mounted on shaft $a$ is a pulley, $b$, which may be a loose pulley or fast upon the shaft, according to circumstances. When this pulley is depended upon to start or stop the sand-pump reel, it is loosely journaled on shaft $a$, and is provided with the cone $b^1$, which acts, with the cup $b^2$ in the band-wheel, to form a clutch, and is controlled by means of a forked shipping-lever, $l$, pivoted on a standard, L.

C indicates the reel or drum of the sand-pump, mounted upon an independent shaft, $c$, provided with bearings $c^1$ $c^1$, and having a band or driving pulley, $c^2$, detachably connected to the drum or reel C by the cone or friction-clutch $d$ $d'$. Either or both driving-pulley $c^2$ and drum C may be loose upon the shaft, and provided with a forked shipping-lever, by which the two may be brought together. The pulleys $b$ and $c^2$ are connected by a belt, B, and either or both may be loose upon or fast to its shaft, or formed in one with its companion wheel of the same shaft; but if both are fast on their shafts, then the drum or sand-pump reel must be made so that it will slide upon its shaft, and should be provided with a shipping-lever, as at $c^3$, the essential feature being the interposition of a clutch mechanism between the sand-pump drum and power.

The operation of the devices is as follows: The sand-pump reel and its mechanism being positioned as shown, or otherwise properly positioned with relation to the power, which is preferably taken from the band-wheel, the belt is passed around the two pulleys $b$ and $c^2$, and one or both pulleys (according to the chosen construction) forced against the companion wheel or reel until the clutch takes hold, and the reel is revolved thereby.

The advantages of my invention are the reduced labor and power required to operate the reel, the facility with which it can be started and stopped, the reduced wear upon the machinery, the evenness and certainty of its action, and the reduced cost of manufacture.

Having thus described my invention, what I claim, and desire to secure by Letters Patent, is—

In a sand-pump reel, the reel-drum mounted upon an independent shaft, and in combination with a driving or band wheel and interposed clutch mechanism, substantially as and for the purpose specified.

In testimony whereof I, the said DEWITT C. BRAWLEY, of Petrolia, Butler county, and State of Pennsylvania, have hereunto set my hand.

DEWITT C. BRAWLEY.

Witnesses:
JOHN K. SMITH,
F. W. RITTER, Jr.